Figure 3:
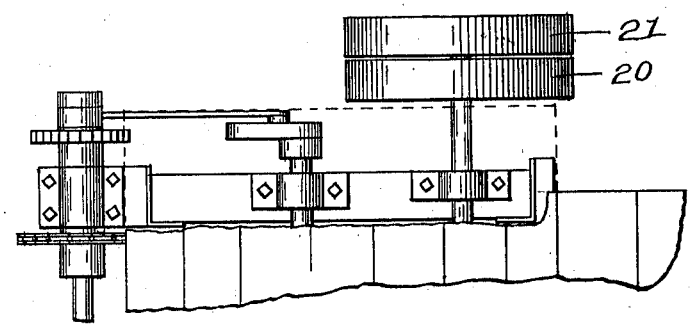
Figure 4:
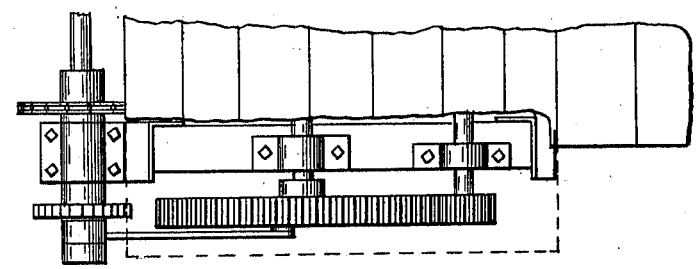
Figure 5:
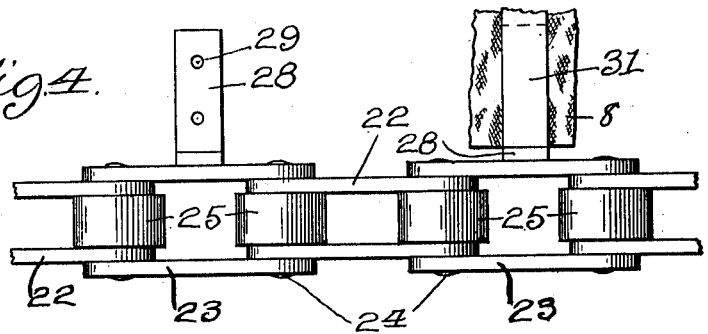
Figure 6:
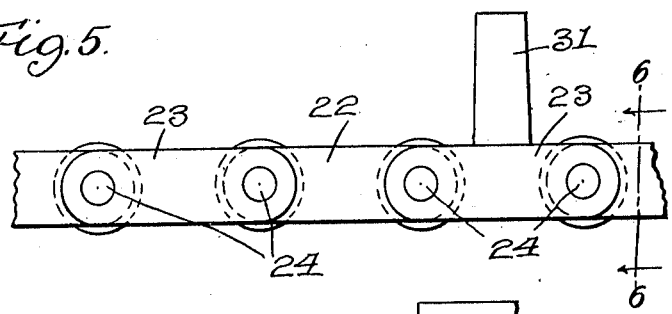

A. H. PIPER.
COMBINED DOUGH PROOFING APPARATUS AND WORK TABLE.
APPLICATION FILED MAR. 18, 1910.
990,003.
Patented Apr. 18, 1911.
2 SHEETS—SHEET 1.
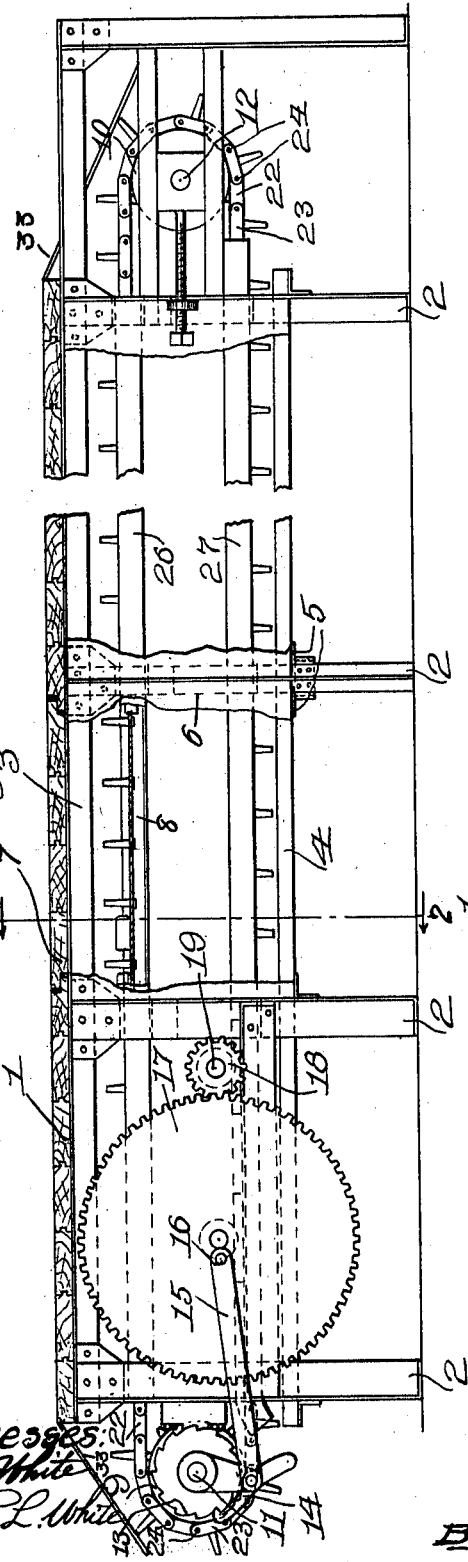
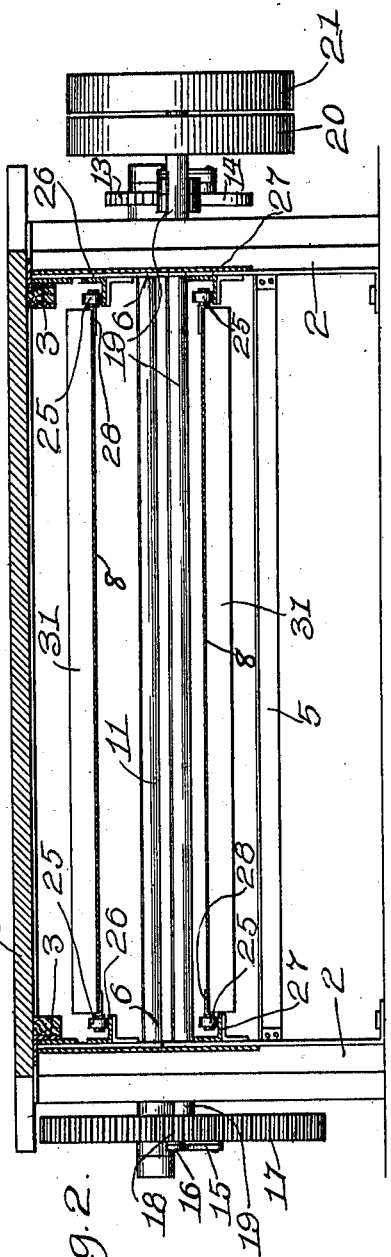

A. H. PIPER.
COMBINED DOUGH PROOFING APPARATUS AND WORK TABLE.
APPLICATION FILED MAR. 18, 1910.

990,003.

Patented Apr. 18, 1911.

2 SHEETS—SHEET 2.

Witnesses:
R. A. White
H. R. L. White

Inventor:
Adolph H. Piper

UNITED STATES PATENT OFFICE.

ADOLPH H. PIPER, OF CHICAGO, ILLINOIS.

COMBINED DOUGH-PROOFING APPARATUS AND WORK-TABLE.

990,003.   Specification of Letters Patent.   Patented Apr. 18, 1911.

Application filed March 18, 1910. Serial No. 550,278.

*To all whom it may concern:*

Be it known that I, ADOLPH H. PIPER, citizen of the United States, residing at Chicago, in the county of Cook and State of Illinois, have invented certain new and useful Improvements in Combined Dough-Proofing Apparatus and Work-Tables; and I do hereby declare the following to be a full, clear, and exact description of the invention, such as will enable others skilled in the art to which it appertains to make and use the same.

This invention relates to a novel construction in a dough proofing table, the object being to provide a simple and efficient device which combines the carrier for dough lumps or loaves and a table for working the dough, and consists in the features of construction and combinations of parts hereinafter fully described and claimed.

In the accompanying drawings illustrating the invention: Figure —1— is a view in side elevation of a dough proofing apparatus constructed in accordance with my invention, one of the side walls thereof being broken away to show the interior of the same. Fig. —2— is a vertical transverse section of the same in the line 2—2 of Fig. —1—. Fig. —3— is a fragmentary detail plan view of the same. Fig. —4— is a fragmentary detail plan view of a sprocket chain employed. Fig. —5— is a fragmentary side elevation of the chain. Fig. —6— is a fragmentary detail vertical transverse section through the chain taken on the line 6—6 of Fig. —5—.

In all bakeries tables are required upon which the bakers work dough into the various forms according to its nature. These tables are always present and usually represent a total area proportioned relatively accurately to the capacity of the plant and the number of men employed. In all of the larger bread producing bakeries a dough proofing apparatus is used. This consists of a closed receptacle through which the lumps of dough are carried very slowly by a mechanical carrier after the same have been cut by the dough dividing machine or other means. While passing through the proofing apparatus the dough rises and after leaving it the lumps are passed into the forming machine which rolls out the dough and reconverts it into substantially cylindrical form and of given length. The dough proofing apparatus is relatively large, its size being dependent to some extent upon the capacity per hour of the bakery. This varies greatly but the total capacity of the dough proofing apparatus must be the total number of loaves produced per hour so that while one batch is being mixed and divided the preceding batch is proofing, the successive operations being thus practically continuous during the bread baking hours. The dough proofing machine ordinarily employed occupies a considerable floor space and on one side thereof is the dough rounding machine and on the delivery side is the loaf forming machine. There is consequently no room for tables near this machine and in the event of a break down causing interruption in the operation of the carrier in the proofing machine or the loaf forming machine, for example, it is essential that the dough be immediately accessible for hand labor to complete the work. This necessitates removal of the dough lumps from the proofing apparatus to tables. A large table area is required to accommodate the number of men necessary to do the same amount of work that is done by the machines and unless these tables are within easy reach of the machines a great deal of time is wasted in transporting the loaves.

My invention has for its object particularly to provide a combined work table and dough-proofing apparatus, and further to provide an improved device of the latter character, and consists, more particularly, in certain details of construction as will be hereinafter more fully pointed out.

In the drawings, the table top 1 is shown supported upon a frame comprising a plurality of pairs of standards 2 disposed on opposite sides and connected together longitudinally of said table by means of the bars 3 and bottom 4, the latter being supported upon the transversely disposed angle irons 5 constituting the cross-bars of the frame. Between said bottom 4 and top 1, side walls 6 are disposed thus forming an inclosed space rectangular in cross section through which the loaves are adapted to travel. Said table top 1 is provided at intervals with removable sections 7 through which access may be had to the carrier 8. The latter consists of two parallel link belts each of which is trained over sprocket wheels 9 and 10 rigidly disposed upon shafts 11 and 12 respectively, extending transversely of the frame at the ends thereof and journaled in bearings suitably supported upon the same.

Said shaft 11 carries a ratchet wheel 13 which is rigid therewith and loosely mounted on said shaft is a crank arm 14 pivotally connected at its free end with the pitman 15 connecting the same with the crank 16 on the shaft of the spur gear 17. The latter meshes with the spur pinion 18 on the drive shaft 19 of the machine, the latter being equipped with fast and loose pulleys 20 and 21 respectively, by means of which it is connected with a source of power. Each of said link chains consists of a plurality of pairs of alternated parallel bars 22 and 23 respectively, said bars 22 projecting at their ends between said bars 23 adjacent the ends of the latter and being pivotally connected therewith by means of pins 24 passing through said pairs of bars 22 and 23 and through rollers 25, the diameters of the latter being greater than the width of said bars 22 and 23. Disposed within the space through which the loaves are adapted to pass and secured to the side walls thereof are angle or T iron rails 26 and 27 upon which said rollers are adapted to travel thereby supporting said chains during their travel through said open space. One of each pair of said links 23 is equipped with an L-shaped projection 28 provided with openings 29 through which screws 30 are adapted to pass into cleats 31 which are thus supported at their ends upon the chains. Secured at regular intervals to the lower edges of said cleats 31 is the belt or carrier 8 of cotton duck, or the like, which is interposed at its edge portions between said cleats 31 and said projections 28 and through which said screws 30 pass into said cleats. The said belt is preferably maintained taut and to this end the upper faces of the L-shaped projections and the lower faces of the cleats are disposed in the plane of the pitch line of the chain so that the belt will neither stretch nor sag when carried around by the sprocket wheels. The frame of the machine projects at one end beyond the table top 1 to provide a space where said belt is exposed for the purpose of receiving the loaves. In order to maintain the compartment through which said loaves travel as free from drafts as possible I provide aprons 33 of cotton duck, or the like, which are secured along one edge to the ends of the table top and depend at their free ends downwardly so as to cover the end portions of said belt.

The object of the proofing device is to give the dough time to rise after being primarily formed into lumps and rounded. This requires a considerable length of time, and, therefore, the conveyer belt or carrier must travel very slowly through the same and the temperature within the device must remain as nearly uniform as possible. As the first loaves reach the other end of the table, they are removed and fed either automatically or manually into the loaf-forming machine.

If the loaf-forming machine should suffer a breakdown it becomes necessary to resort to manual labor to do its work and in that case the bakers range themselves on either side of the table and by raising the removable sections take the dough lumps off the carrier and work them on the adjacent surfaces.

The length and width of the device are governed by the number of loaves to be handled. The greater the number of the latter the greater the table area required in an emergency so that with my device the table area and conveyer belt area are always properly proportioned respectively and both devices together occupy a common floor area and afford the greatest convenience for the reason that the loaves or lumps of dough do not have to be conveyed from the dough-proofing device to the table. Consequently besides saving floor space my device saves time in handling the dough. It may also be used in place of the tables ordinarily provided for handling cake and pie dough, etc.

I claim as my invention:

1. A dough-proofing apparatus comprising a frame, a work table supported thereon equipped with removable sections, a compartment below said work table extending longitudinally of said frame and equipped with a bottom and side walls, bearings supported on said frame at the ends of said compartments, shafts journaled therein equipped with sprocket-wheels, gearing between one of said shafts and a source of power, rails disposed on the side walls of said compartment, sprocket chains trained over said sprocket wheels and supported intermediate of the latter on said rails, cleats mounted at their opposite ends upon sprocket chains disposed on opposite sides of said compartment, said cleats constituting the end walls of troughs adapted to receive lumps of dough, and fabric forming the bottoms of said troughs secured to said cleats.

2. A combined dough-proofing apparatus and work table, comprising a frame, a table top supported thereon equipped with removable sections, a chute extending longitudinally of said frame covered by said table top, rails disposed upon opposite sides of said chute within the same, bearings supported on said frame beyond the ends of said chute, one pair of said bearings being adjustable toward and from the other thereof, shafts journaled in said bearings, sprocket wheels carried thereby, gearing between one of said shafts and a source of power, a pair of sprocket chains passing through said chute at opposite sides thereof and trained over said sprocket wheels, said chains being supported on said rails within said chute, cleats forming the end walls of troughs mounted at their ends upon said respective chains, and fabric forming the bottom walls of said troughs secured to the said cleats.

3. A combined dough-proofing apparatus and work table, comprising a frame, a table top supported thereon equipped with removable sections, a chute extending longitudinally of said frame covered by said table top, rails disposed upon opposite sides of said chute within the same, bearings supported on said frame beyond the ends of said chute, one pair of said bearings being adjustable toward and from the other thereof, shafts journaled in said bearings, sprocket wheels carried thereby, a drive shaft supported on said frame, a counter shaft geared thereto, a crank on the latter, a crank loosely mounted on one of said first-named shafts, a dog carried thereby, a ratchet wheel rigid on said last-named shaft adapted to be engaged by said dog to actuate the said shaft, a pitman connecting said cranks with each other, a pair of sprocket chains passing through said chute at opposite sides thereof and trained over said sprocket wheels, said chains being supported on said rails within said chute, cleats forming the end walls of troughs mounted at their ends upon said respective chains, and fabric forming the bottom walls of said troughs secured to the said cleats.

4. A combined dough-proofing apparatus and work table, comprising a frame, a table top supported thereon equipped with removable sections, a chute extending longitudinally of said frame covered by said table top, rails disposed upon opposite sides of said chute within the same, bearings supported on said frame beyond the ends of said chute, one pair of said bearings being adjustable toward and from the other thereof, shafts journaled in said bearings, sprocket wheels carried thereby, a drive shaft supported on said frame, a counter shaft geared thereto, a crank on the latter, a crank loosely mounted on one of said first-named shafts, a dog carried thereby, a ratchet-wheel rigid on said last-named shaft adapted to be engaged by said dog to actuate the said shaft, a pitman connecting said cranks with each other, a pair of sprocket chains passing through said chute at opposite sides thereof and trained over said sprocket wheels, rollers interposed in said chains at intervals and adapted to travel on said rails within said chute, said chains being supported on said rails within said chute, cleats forming the end walls of troughs mounted at their ends upon said respective chains, and fabric forming the bottom walls of said troughs secured to the said cleats.

In testimony whereof I have signed my name in presence of two subscribing witnesses.

ADOLPH H. PIPER.

Witnesses:
RUDOLPH WM. LOTZ,
E. H. MACDOWELL.

---

Copies of this patent may be obtained for five cents each, by addressing the "Commissioner of Patents, Washington, D. C."